(12) United States Patent
Yang et al.

(10) Patent No.: US 9,237,562 B2
(45) Date of Patent: Jan. 12, 2016

(54) METHOD FOR DOWNLINK CHANNEL STATE INFORMATION FEEDBACK IN MULTI-ANTENNA MULTI-CARRIER MULTI-CELL ENVIRONMENT

(75) Inventors: Zeng Yang, Pudong (CN); Ming Ding, Pudong (CN); Lei Huang, Pudong (CN); Renmao Liu, Pudong (CN)

(73) Assignee: SHARP KABUSHIKI KAISHA, Osaka (JP)

( * ) Notice: Subject to any disclaimer, the term of this patent is extended or adjusted under 35 U.S.C. 154(b) by 118 days.

(21) Appl. No.: 13/978,755

(22) PCT Filed: Jan. 10, 2012

(86) PCT No.: PCT/JP2012/050655
§ 371 (c)(1),
(2), (4) Date: Jul. 9, 2013

(87) PCT Pub. No.: WO2012/096393
PCT Pub. Date: Jul. 19, 2012

(65) Prior Publication Data
US 2013/0286991 A1 Oct. 31, 2013

(30) Foreign Application Priority Data

Jan. 10, 2011 (CN) .......................... 2011 1 0008014

(51) Int. Cl.
*H04L 5/00* (2006.01)
*H04W 72/04* (2009.01)
(Continued)

(52) U.S. Cl.
CPC ......... *H04W 72/0413* (2013.01); *H04L 5/0032* (2013.01); *H04L 5/0053* (2013.01); *H04L5/0073* (2013.01); *H04W 28/26* (2013.01); *H04W 72/005* (2013.01); *H04W 72/1268* (2013.01); *H04J 2211/005* (2013.01);
(Continued)

(58) Field of Classification Search
CPC ...... H04W 24/10; H04W 36/30; H04W 28/26; H04W 72/005; H04L 5/0073; H04L 5/0078; H04J 2211/005
See application file for complete search history.

(56) References Cited

U.S. PATENT DOCUMENTS

2011/0110246 A1* 5/2011 Damnjanovic et al. ....... 370/252

OTHER PUBLICATIONS

3GPP, "TS 36.213 v.10.0.1", Dec. 2010 pp. 1-99.*
(Continued)

*Primary Examiner* — Andrew Chriss
*Assistant Examiner* — Salvador E Rivas
(74) *Attorney, Agent, or Firm* — Keating & Bennett, LLP

(57) ABSTRACT

A method of resource allocation for Channel State Information (CSI) feedback is provided, which comprises the following steps of: configuring, for a User Equipment (UE), a CSI feedback mode for each of a plurality of coordinated cells; allocating feedback resources required for CSI feedback by the UE for each of the plurality of coordinated cells based on the configured feedback modes, such that the CSI feedbacks for different coordinated cells will not collide with each other within one sub-frame; and notifying the configured feedback modes and the allocated feedback resources to the UE. In addition, a method of Channel State Information (CSI) feedback is provided, which comprises the following steps of: receiving, at a User Equipment (UE), from a Base Station (BS) information on configured feedback modes and allocated feedback resources for CSI feedback for a plurality of coordinated cells; feeding, by the UE, the CSI of the plurality of coordinated cells back to the BS over the allocated feedback resources based on the configured feedback modes; and solving, when feedback types underlying different feedback modes collide with each other within one sub-frame, the collision based on a collision solution rule.

6 Claims, 8 Drawing Sheets

(51) Int. Cl.
  *H04W 72/00* (2009.01)
  *H04W 28/26* (2009.01)
  *H04W 72/12* (2009.01)
  *H04W 36/30* (2009.01)
  *H04W 24/10* (2009.01)
  *H04W 48/08* (2009.01)

(52) U.S. Cl.
  CPC .............. *H04L 5/0078* (2013.01); *H04W 24/10* (2013.01); *H04W 36/30* (2013.01); *H04W 48/08* (2013.01); *H04W 72/04* (2013.01); *H04W 72/042* (2013.01)

(56) References Cited

OTHER PUBLICATIONS

Official Communication issued in International Patent Application No. PCT/JP2012/050655, mailed on Feb. 14, 2012.

"3rd Generation Partnership Project; Technical Specification Group Radio Access Network; Evolved Universal Terrestrial Radio Access (E-UTRA); Physical layer procedures (Release 10)", 3GPP TS 36.213, V10.0.1, Dec. 2010, 98 pages.

* cited by examiner

F I G. 1
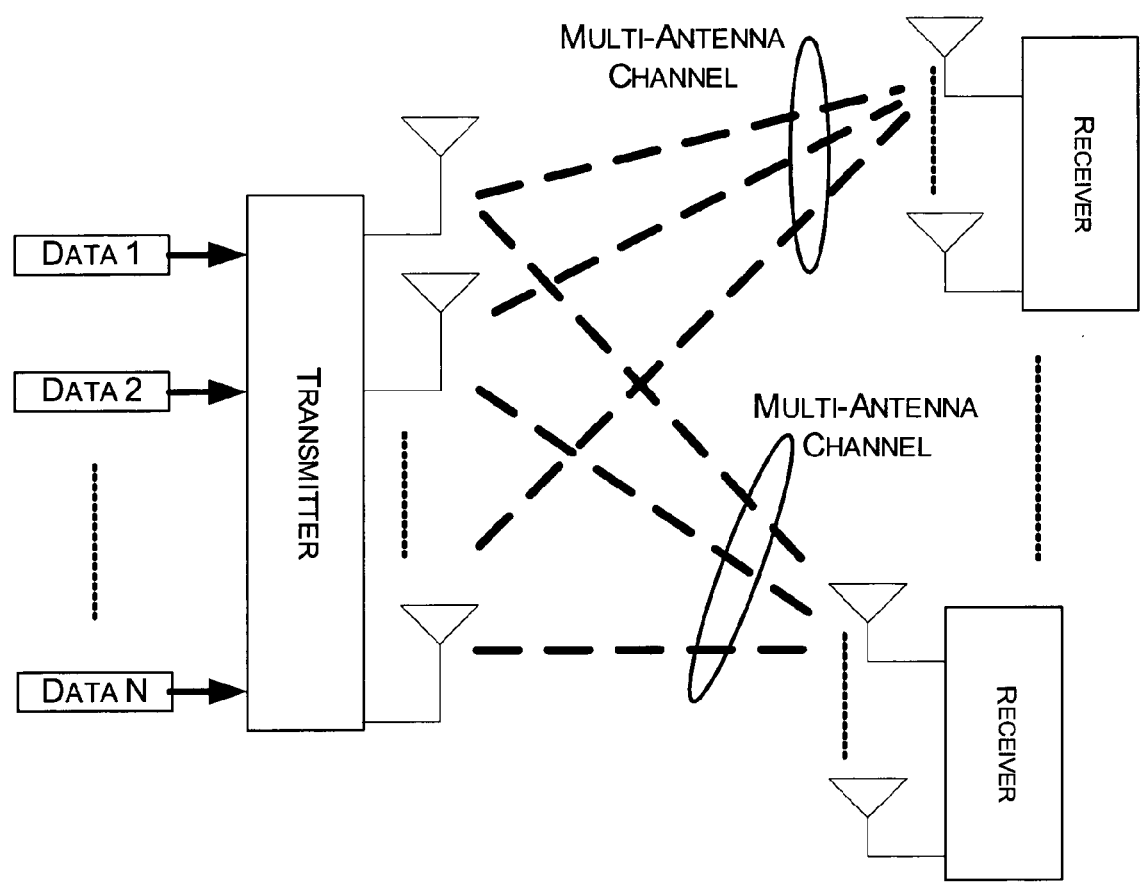

F I G. 2
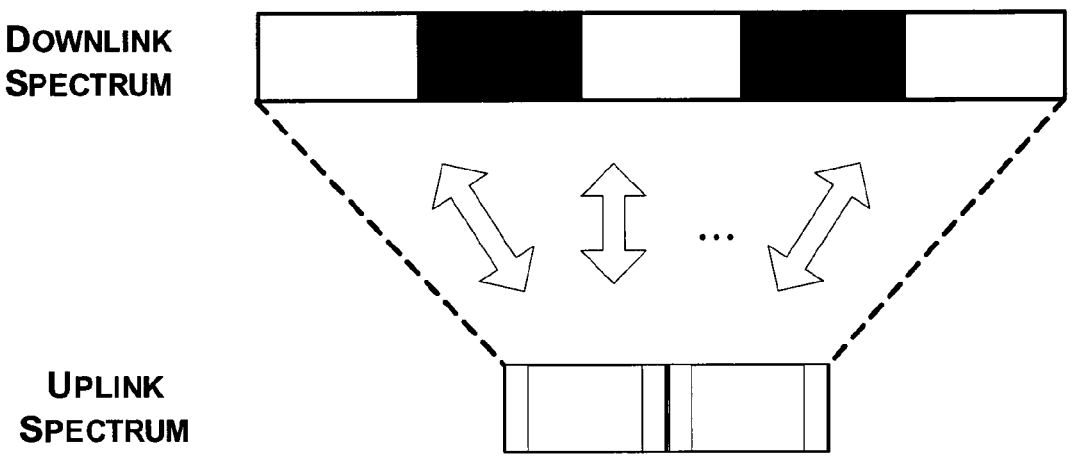
DOWNLINK SPECTRUM
UPLINK SPECTRUM

F I G. 4
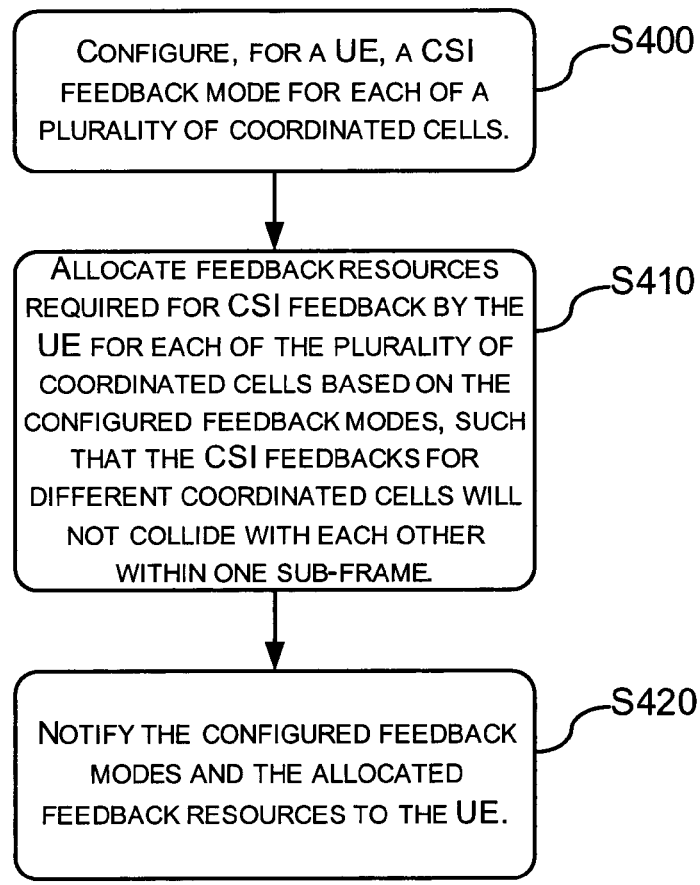

F I G. 5
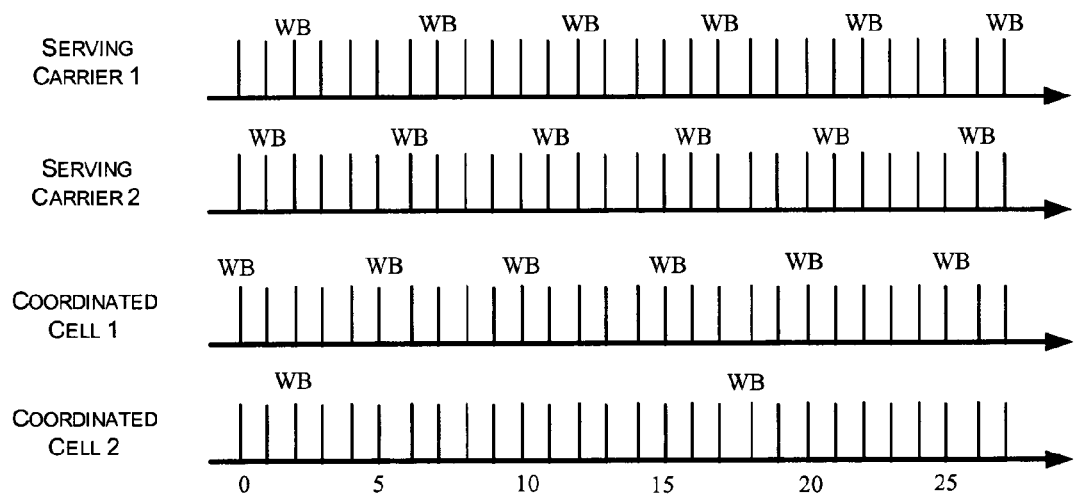

F I G. 6
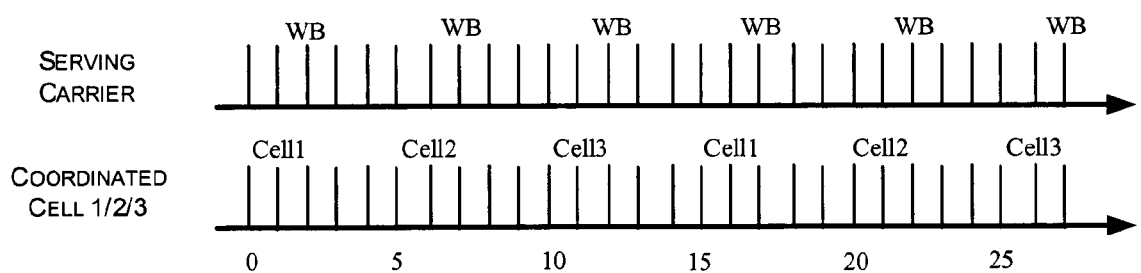

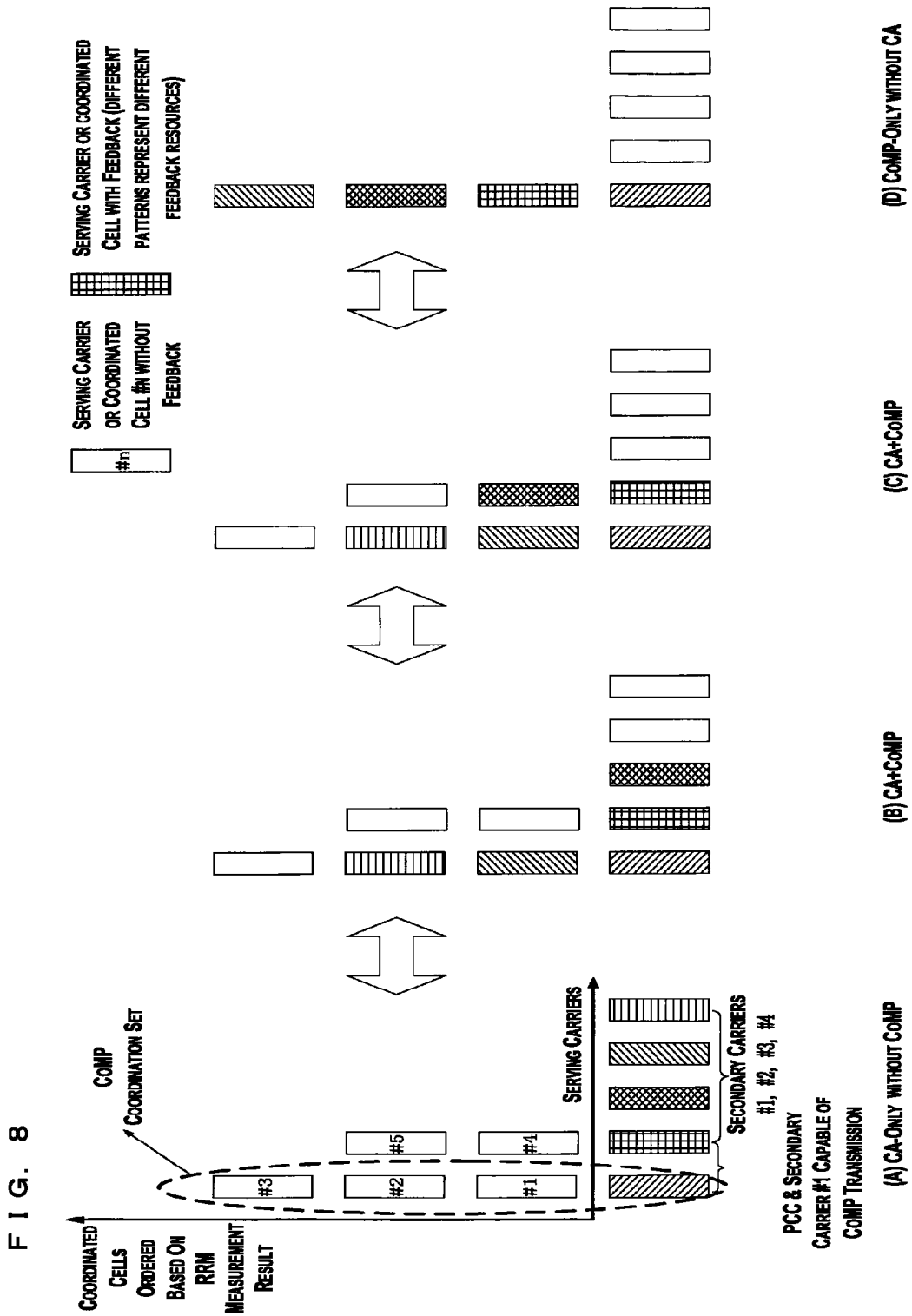

METHOD FOR DOWNLINK CHANNEL STATE INFORMATION FEEDBACK IN MULTI-ANTENNA MULTI-CARRIER MULTI-CELL ENVIRONMENT

TECHNICAL FIELD

The invention relates to communication technology, and more particularly, to a technique for feedback of downlink Channel State Information (CSI) from a user equipment (UE) to a base station (BS) in a multi-cell environment consisting of multi-antenna multi-carrier base stations.

BACKGROUND ART

Multi-antenna wireless transmission technique, or Multiple In Multiple Out (MIMO), can achieve spatial multiplex gain and spatial diversity gain by deploying a plurality of antennas at both the transmitter and the receiver and utilizing the spatial resources in wireless transmission. Researches on information theory have shown that the capacity of a MIMO system grows linearly with the minimum of the number of transmitting antennas and the number of receiving antennas. FIG. 1 shows a schematic diagram of a MIMO system. As shown in FIG. 1, a plurality of antennas at the transmitter and a plurality of antennas at each of the receivers constitute a multi-antenna wireless channel containing spatial domain information. Further, Orthogonal Frequency Division Multiplexing (OFDM) technique has a strong anti-fading capability and high frequency utilization and is thus suitable for high speed data transmission in a multi-path and fading environment. The MIMO-OFDM technique, in which MIMO and OFDM are combined, has become a core technique for a new generation of mobile communication.

For instance, the 3rd Generation Partnership Project (3GPP) organization is an international organization in mobile communication field which plays an important role in standardization of 3G cellular communication technologies. Since the second half of the year 2004, the 3GPP organization has initiated a so-called Long Term Evolution (LTE) project for designing Evolved Universal Terrestrial Radio Access (EUTRA) and Evolved Universal Terrestrial Radio Access Network (EUTRAN). The MIMO-OFDM technique is employed in the downlink of the LTE system. In a conference held in Shenzhen, China in April 2008, the 3GPP organization started a discussion on the standardization of 4G cellular communication systems (currently referred to as LTE-A systems). Again, the MIMO-OFDM technique becomes a key technique for air interface in the LTE-A system.

In the LTE-A system, Carrier Aggregation (CA) is a new concept. FIG. 2 illustrates the CA concept in which a base station is provided with a plurality of downlink carriers and a plurality of uplink carriers. A number of carriers can be virtually combined into one carrier, which is referred to as carrier aggregation. The LTE-A system can support continuous CA as well as intra-band or inter-band non-continuous CA, with a maximum aggregated bandwidth of 100 MHz. In order to ensure effective utilization of the carriers at the initial stage of the commercial deployment of the LTE-A system, i.e., to ensure that LTE UEs can access the LTE-A system, each carrier should be configured to be backward compatible with the LTE system. However, it is also possible to design a carrier dedicated to the LTE-A system.

In the LTE-A system, a concept known as Coordinated Multi-Point (CoMP) transmission gets extensive attention and support. The core idea of CoMP is to solve the problem of downlink inter-cell interference by coordination between a plurality of base stations (cells), thereby providing improved data transmission rate and user experience for a UE located at the edge of a cell.

At the research stage of the LTE-A system, one of the major research subjects relates to design of control channel, including feedback of downlink CSI from a UE to a BS.

There are two feedback channels for downlink CSI feedback, a Physical Uplink Control CHannel (PUCCH) and a Physical Uplink Shared CHannel (PUSCH). In general, the PUCCH is configured for transmission of synchronized, basic CSI with low payload; while PUSCH is configured for transmission of bursty, extended CSI with high payload. For the PUCCH, a complete CSI is composed of different feedback contents which are transmitted in different sub-frames. For the PUSCH, on the other hand, a complete CSI is transmitted within one sub-frame. Such design principles remain applicable in the LET-A system.

The feedback contents can be divided into three categories: Channel Quality Index (CQI), Pre-coding Matrix Index (PMI) and Rand Index (RI), all of which are bit quantized feedbacks. In the LTE-A system, these three categories of contents are still the primary feedback contents.

In the LTE-A system, the following eight types of MIMO transmission approaches for downlink data are defined:

1) Single antenna transmission. This is used for signal transmission at a single antenna BS. This approach is a special instance of MIMO system and can only transmit a single layer of data.

2) Transmission diversity. In a MIMO system, diversity effects of time and/or frequency can be utilized to transmit signals, so as to improve the reception quality of the signals. This approach can only transmit a single layer of data.

3) Open-loop space division multiplexing. This is a space division multiplexing without the need for PMI feedback from UE.

4) Closed-loop space division multiplexing. This is a space division multiplexing in which PMI feedback from UE is required.

5) Multi-user MIMO. There are multiple UEs simultaneously participating in the downlink communication of the MIMO system.

6) Closed-loop single layer pre-coding. Only one single layer of data is transmitted using the MIMO system. The PMI feedback from UE is required.

7) Beam forming transmission. The beam forming technique is employed in the MIMO system. A dedicated reference signal is used for data demodulation at UE. Only one single layer of data is transmitted using the MIMO system. The PMI feedback from UE is not required.

8) Two-layer beam forming transmission. The UE can be configured to feed back PMI and RI, or not to feed back PMI and RI.

In the LTE-A system, the above eight types of transmission approaches may be retained and/or canceled, and/or a new transmission approach, dynamic MIMO switching, can be added, by which the BS can dynamically adjust the MIMO mode in which the UE operates.

In the LTE-A system, if a UE is configured to operate in the CA status, the transmission approach on each carrier for the UE can be configured to be one of the above transmission approaches via upper layer signaling (in a semi-static manner). On the other hand, if a UE is configured to operate in the CoMP status, the transmission approach on a carrier for the UE may be configured to be the above transmission approach 4), 5) or the dynamic MIMO switching approach.

In order to support the above MIMO transmission approaches, a variety of CSI feedback modes are defined in the LTE system, all of which are inherited by the LTE-A system. Each MIMO transmission approach corresponds to a number of CSI feedback modes, as detailed in the following.

There are four CSI feedback modes for the PUCCH, Mode 1-0, Mode 1-1, Mode 2-0 and Mode 2-1. These modes are combination of four types of feedbacks, including:

1) Type 1: one preferred sub-band location in a Band Part (BP, which is a subset of the Set S and has its size dependent on the size of the Set S) and a CQI for the sub-band. The respective overheads are L bits for the sub-band location, 4 bits for the CQI of the first codeword and 3 bits for the CQI of the possible second codeword which is differentially coded with respect to the CQI of the first codeword.

2) Type 2: broadband CQI and PMI. The respective overheads are 4 bits for the CQI of the first codeword, 3 bits for the CQI of the possible second codeword which is differentially coded with respect to the CQI of the first codeword and 1, 2 or 4 bits for PMI depending on the antenna configuration at BS.

3) Type 3: RI. The overhead for RI is 1 bit for two antennas, or 2 bits for four antennas, depending on the antenna configuration at BS.

4) Type 4: broadband CQI. The overhead is constantly 4 bits.

All the frequency areas corresponding to the CSI feedback are referred to as Set S. In the LTE system where there are only single-carrier situations, the Set S is defined as equal to the carrier bandwidth of the system. In the LTE-A system where there are additionally multi-carrier situations, the Set S can be defined as equal to the bandwidth of one single carrier or equal to the summed bandwidth of multiple carriers.

The UE feeds back different information to the BS in correspondence with the above different types.

The Mode 1-0 is a combination of Type 3 and Type 4. That is, the feedbacks of Type 3 and Type 4 are carried out at different periods and/or with different sub-frame offsets. In the Mode 1-0, the broadband CQI of the first codeword in the Set S and possibly the RI information are fed back.

The Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back.

The Mode 2-0 is a combination of Type 3, Type 4 and Type 1. That is, the feedbacks of Type 3, Type 4 and Type 1 are carried out at different periods and/or with different sub-frame offsets. In the Mode 2-0, the broadband CQI of the first codeword in the Set S, possibly the RI information as well as one preferred sub-band location in the BP and the CQI for the sub-band are fed back.

The Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back.

There are thus the following correspondence between the MIMO transmission approaches and the CSI feedback modes:

MIMO transmission approach 1): Mode 1-0 and Mode 2-0;
MIMO transmission approach 2): Mode 1-0 and Mode 2-0;
MIMO transmission approach 3): Mode 1-0 and Mode 2-0;
MIMO transmission approach 4): Mode 1-1 and Mode 2-1;
MIMO transmission approach 5): Mode 1-1 and Mode 2-1;
MIMO transmission approach 6): Mode 1-1 and Mode 2-1;
MIMO transmission approach 7): Mode 1-0 and Mode 2-0;
MIMO transmission approach 8): Mode 1-1 and Mode 2-1, with PMI/RI feedback from UE; and
MIMO transmission approach 8): Mode 1-0 and Mode 2-0, without PMI/RI feedback from UE.

In the CoMP status, the feedback modes for a UE are consistent with those corresponding to the above transmission approaches 4) and 5). That is, the feedback modes for a UE operating in the CoMP status incorporate Mode 1-1 and Mode 2-1. However, the Mode 1-1 and Mode 2-1 in the LTE-A system are optimized for a scenario where a BS is equipped with 8 transmission antennas. That is, a PMI is collectively determined from two channel pre-coding matrix indices, W1 and W2, where W1 represents broadband/long-term channel characteristics and W2 represents sub-band/short-term channel characteristics. For transmission of W1 and W2 over PUCCH, Mode 1-1 can be sub-divided into two sub-modes: Mode 1-1A and Mode 1-1B. In Mode 1-1A, the RI and the down-sampled W1 are jointly coded and then fed back as Type 3 and W2 is fed back as Type 2. In Mode 1-1B, the down-sampled W1 and the down-sampled W2 are jointly coded and fed back as Type 2. Accordingly, Mode 2-1 can also be sub-divided into two sub-modes: Mode 2-1A and Mode 2-1B. In both Mode 2-1A and Mode 2-1B, the RI and 1-bit information known as Pre-coding Type Indicator (PTI) are jointly coded and fed back as Type 3. The PTI having a value of 0 and 1 indicates that the corresponding sub-mode is Mode 2-1A and Mode 2-1B, respectively. In Mode 2-1A, W1 is fed back as Type 2 and the broadband W2 is fed back as Type 1, while in Mode 2-1B, the broadband W2 is fed back as Type 2 and the sub-band W2 is fed back as Type 1. It is to be noted that the Type 1 as used herein differs from the Type 1 defined in LTE Release 8 in that not only the CQI, but also the corresponding PMI, need to be fed back. In this regard, reference can be made to 3GPP R1-106514, "Way Forward on further details about PUCCH".

In the CoMP status, a UE may need to report, for a set of cells, the channel state/statistical information for the links between the UE and BSs of the respective cells. This set of cells is referred to as CoMP measurement set. The cells for which the information is actually fed back by the UE can be a subset of the measurement set, referred to as report set. The measurement set can be the same as the CoMP coordination set which contains cells (BSs) participating in the Physical Downlink Shared Channel transmission for the UE, directly or indirectly. The coordination set may be or may be not transparent to the UE.

For a UE configured in the CoMP status, the feedback is mainly carried out separately in each cell and is transmitted over the uplink resources of the serving cell.

On the other hand, there are five CSI feedback modes for the PUSCH, Mode 1-2, Mode 3-0, Mode 3-1, Mode 2-0 and Mode 2-2.

In the Mode 1-2, the PMIs of the individual sub-bands in the Set S, the broadband CQIs of the individual sub-bands in the Set S and possibly the RI information are fed back.

In the Mode 3-0, the CQI for the first codeword of each sub-band in the Set S, the broadband CQI of the first codeword in the Set S and possibly the RI information are fed back. Herein, the sub-band CQIs are differentially coded with respect to the broadband CQI, so as to reduce feedback overhead.

In the Mode 3-1, the CQIs for the individual codewords of each sub-band in the Set S, the broadband CQIs of the individual codewords in the Set S, the broadband PMI of the Set S and possibly the RI information are fed back. Herein, the sub-band CQIs are differentially coded with respect to the broadband CQIs, so as to reduce feedback overhead.

In the Mode 2-0, the locations of the preferred M sub-bands in the Set S, the broadband CQI for the first codeword in each of the M sub-bands, the broadband CQI of the first codeword in the Set S and possibly the RI information are fed back.

In the Mode 2-2, the locations of the preferred M sub-bands in the Set S, the broadband PMIs for the M sub-bands, the broadband CQIs for the individual codewords in each of the M sub-bands, the broadband PMI of the Set S, the broadband CQIs of the individual codewords in the Set S and possibly the RI information are fed back.

There are thus the following correspondence between the MIMO transmission approaches and the CSI feedback modes:

MIMO transmission approach 1): Mode 2-0 and Mode 2-0;
MIMO transmission approach 2): Mode 2-0 and Mode 3-0;
MIMO transmission approach 3): Mode 2-0 and Mode 3-0;
MIMO transmission approach 4): Mode 1-2, Mode 2-2 and Mode 3-1;
MIMO transmission approach 5): Mode 3-1;
MIMO transmission approach 6): Mode 1-2, Mode 2-2 and Mode 3-1;
MIMO transmission approach 7): Mode 2-0 and Mode 3-0;
MIMO transmission approach 8): Mode 1-2, Mode 2-2 and Mode 3-1, with PMI/RI feedback from UE; and
MIMO transmission approach 8): Mode 2-0 and Mode 3-0, without PMI/RI feedback from UE.

In the LTE system, the periodic CSI feedback occupies the feedback resources on PUCCH. Its resource allocation involves frequency domain resource allocation, which is determined from a parameter $n_{PUCCH}^{(2)}$ (cf. TR36.211 V9.1.0, "Physical channel and modulation"), and time domain resource allocation, which is determined from the feedback periods and sub-frame offsets of the respective feedback types (cf. TR36.213 V9.1.0, "Physical layer procedures"). In the LTE-A and its subsequent systems, there are two approaches for increasing the payload of uplink periodic feedback while maintaining the uplink single-carrier characteristic: one is to feed back several sets of feedback contents cyclically in time and the other is to increase the payload of one feedback by means of periodic PUSCH feedback.

There are currently few references available for the downlink multi-antenna multi-carrier multi-cell CSI feedback in the LTE-A system, as this has not been discussed in the standardization process. However, the multi-carrier CSI feedback is currently under discussion in the standardization process. Approaches which are now extensively supported include (cf. 3GPP R1-106525, "Way Forward on Periodic CQI/PMI/RI in CA"):

1) The high layer configuration parameters of periodic CQI/PMI/RI feedback can be configured for each downlink carrier individually according to the LTE Rel-8 specification.

2) If the PUCCH+PUSCH concurrent transmission characteristic is not enabled, periodic CQI/PMI/RI for only one downlink carrier is fed back in a sub-frame. The downlink carrier is selected based on a defined priority, which applies to both scenarios with and without PUSCH. The periodic CQI/PMI/RI feedbacks for other downlink carriers will be discarded.

3) The collision between different feedback types on the selected downlink carrier is solved according to the LTE Rel-8 specification.

SUMMARY OF INVENTION

It is an object of the present invention to solve the problem of insufficient and inoperable downlink CSI feedback for a multi-antenna multi-carrier multi-cell environment in the prior art by providing a novel method of resource allocation for CSI feedback and method of CSI feedback.

According to the first solution of the present invention, a method of resource allocation for Channel State Information (CSI) feedback is provided, which comprises the following steps of: configuring, for a User Equipment (UE), a CSI feedback mode for each of a plurality of coordinated cells; allocating feedback resources required for CSI feedback by the UE for each of the plurality of coordinated cells based on the configured feedback modes, such that the CSI feedbacks for different coordinated cells will not collide with each other within one sub-frame; and notifying the configured feedback modes and the allocated feedback resources to the UE.

Preferably, the step of allocating feedback resources comprises: increasing the period of the feedback resources corresponding to different coordinated cells.

Preferably, the step of allocating feedback resources comprises: setting, for a single UE, the feedback period of a feedback type underlying a feedback mode of a coordinated cell to be a multiple of the feedback period of a feedback type underlying a feedback mode of another coordinated cell; and setting, for a single UE, a feedback type underlying a feedback mode of a coordinated cell to have a different sub-frame offset than a feedback type underlying a feedback mode of another coordinated cell.

Preferably, the method further comprises: configuring the UE into a Carrier Aggregation (CA) status and a Coordinated Multi-Point (CoMP) status, prior to the step of configuring feedback mode; wherein the step of configuring feedback mode further comprises configuring, for the UE, a CSI feedback mode for each of a plurality of serving carriers in the CA status; and wherein the step of allocating feedback resources further comprises allocating feedback resources required for CSI feedback by the UE for each of the plurality of serving carriers, such that the CSI feedbacks for different serving carriers and/or different coordinated cells not collide with each other within one sub-frame.

Preferably, the feedback resources are shared between the CSI feedbacks for the plurality of serving carriers and for the plurality of coordinated cells; the method further comprises: indicating to the UE the allocation of the feedback resources between the CSI feedbacks for the plurality of serving carriers and for the plurality of coordinated cells.

Preferably, the step of allocating feedback resources further comprises: increasing the period of the feedback resources corresponding to different serving carriers and different coordinated cells.

Preferably, the step of allocating feedback resources comprises: setting, for a single UE, the feedback period of a feedback type underlying a feedback mode of a serving carrier or a coordinated cell to be a multiple of the feedback period of a feedback type underlying a feedback mode of another serving carrier or another coordinated cell; and setting, for a single UE, a feedback type underlying a feedback mode of a serving carrier or a coordinated cell to have a different sub-frame offset than a feedback type underlying a feedback mode of another serving carrier or another coordinated cell.

Preferably, the step of allocating feedback resources comprises: multiplexing the CSI feedback resources for the plurality of coordinated cells.

Preferably, the step of allocating feedback resources comprises: configuring a semi-persistent schedule via upper layer signaling to schedule a period Physical Uplink Shared Channel (PUSCH) as the CSI feedback resources.

Preferably, the plurality of coordinated cells belong to a feedback set; the method further comprises: determining the feedback set, the feedback set being a measurement set containing cells to be measured when the UE is configured into the CoMP status or a subset thereof.

Preferably, the measurement set is determined from at least one of: a Radio Resource Management (RRM) measurement result measured and fed back by the UE, the RRM measurement including intra-cell and inter-cell measurements; a predetermined serving carrier for the CoMP status and a corresponding coordinated cell; and UE measured channel information obtained by aperiodic channel information feedback, including a predetermined serving carrier for the CoMP status and a corresponding coordinated cell.

Preferably, the configured feedback mode and the allocated feedback resources are notified to the UE via upper layer signaling.

According to the second solution of the present invention, a method of Channel State Information (CSI) feedback is provided, which comprises the following steps of: receiving, at a User Equipment (UE), from a Base Station (BS) information on configured feedback modes and allocated feedback resources for CSI feedback for a plurality of coordinated cells; feeding, by the UE, the CSI of the plurality of coordinated cells back to the BS over the allocated feedback resources based on the configured feedback modes; and solving, when types underlying different feedback modes collide with each other within one sub-frame, the collision based on a collision solution rule.

Preferably, the method further comprises: configuring, by the BS, the UE into a Carrier Aggregation (CA) status and a Coordinated Multi-Point (CoMP) status; wherein the UE further receives from the BS information on configured feedback modes and allocated feedback resources for CSI feedback for a plurality of serving carriers in the CA status.

Preferably, the feedback resources are shared between the CSI feedbacks for the plurality of serving carriers and for the plurality of coordinated cells; the method further comprises: receiving, by the UE, from the BS the allocation of the feedback resources the CSI feedbacks for the plurality of serving carriers and for the plurality of coordinated cells.

Preferably, the collision solution rule is defined as a type-prioritized rule in which a type with a longer period has a higher priority; and when a collision occurs, a type with a high priority will be fed back while a type with a low priority will be discarded.

Preferably, the collision solution rule is defined as a mode-prioritized rule in which a mode with a lower feedback overhead has a higher priority, the priority of a mode being the priority of each type contained in the mode; and when a collision occurs, a type with a high priority will be fed back while a type with a low priority will be discarded.

Preferably, the collision solution rule is defined as a mode-prioritized rule in which each mode has a pre-configured priority, the priority of a mode being the priority of each type contained in the mode; and when a collision occurs, a type with a high priority will be fed back while a type with a low priority will be discarded.

Preferably, the collision solution rule is defined as a coordinated-cell-prioritized rule in which each mode for a coordinated cell has a pre-configured priority, the priority of a mode being the priority of each type contained in the mode; and when a collision occurs, a type with a high priority will be fed back while a type with a low priority will be discarded.

Preferably, the collision solution rule is defined as a serving-carrier/coordinated-cell-prioritized rule in which each mode for a serving carrier or a coordinated cell has a pre-configured priority, the priority of a mode being the priority of each type contained in the mode; and when a collision occurs, a type with a high priority will be fed back while a type with a low priority will be discarded.

Preferably, the collision solution rule is defined as a content-prioritized rule in which a type carrying larger amount of information has a higher priority; and when a collision occurs, a type with a high priority will be fed back while a type with a low priority will be discarded.

Preferably, the collision solution rule is defined as a upper-layer-signaling-notification-prioritized rule in which the priorities of the types for the plurality of coordinated cells are notified from the BS to the UE via upper layer signaling; and when a collision occurs, a type with a high priority will be fed back while a type with a low priority will be discarded.

Preferably, the collision solution rule is defined as a upper-layer-signaling-notification-prioritized rule in which the priorities of the types for the plurality of serving carriers and the plurality of coordinated cells are notified from the BS to the UE via upper layer signaling; and when a collision occurs, a type with a high priority will be fed back while a type with a low priority will be discarded.

BRIEF DESCRIPTION OF DRAWINGS

The above and other objects, features and advantages of the present invention will be more apparent from the following preferred embodiments illustrated with reference to the figures, in which:

FIG. 1 is a schematic diagram of a MIMO system;

FIG. 2 is a schematic diagram of carrier aggregation;

FIG. 4 is a flowchart illustrating the method of resource allocation for CSI feedback according to the present invention;

FIG. 5 is a schematic diagram of a resource allocation for multi-cell CSI feedback;

FIG. 6 is a schematic diagram showing time domain resources for CSI feedback for a plurality of coordinated cells multiplexed into a LTE Rel-8 reporting period;

FIG. 8 is a schematic diagram of feedback resource allocation when UE is configured into the CA status and the CoMP status.

DESCRIPTION OF EMBODIMENTS

Preferred embodiments of the present invention will be detailed with reference to the drawings. In the following description, details and functions unnecessary to the present invention are omitted so as not to obscure the concept of the invention.

For clear and detailed explanation of the implementation steps of the present invention, some specific examples applicable to the LTE-A cellular communication system are given below. Herein, it is to be noted that the present invention is not limited to the application exemplified in the embodiments. Rather, it is applicable to other communication systems, such as the future 5G system.

Figure 3:
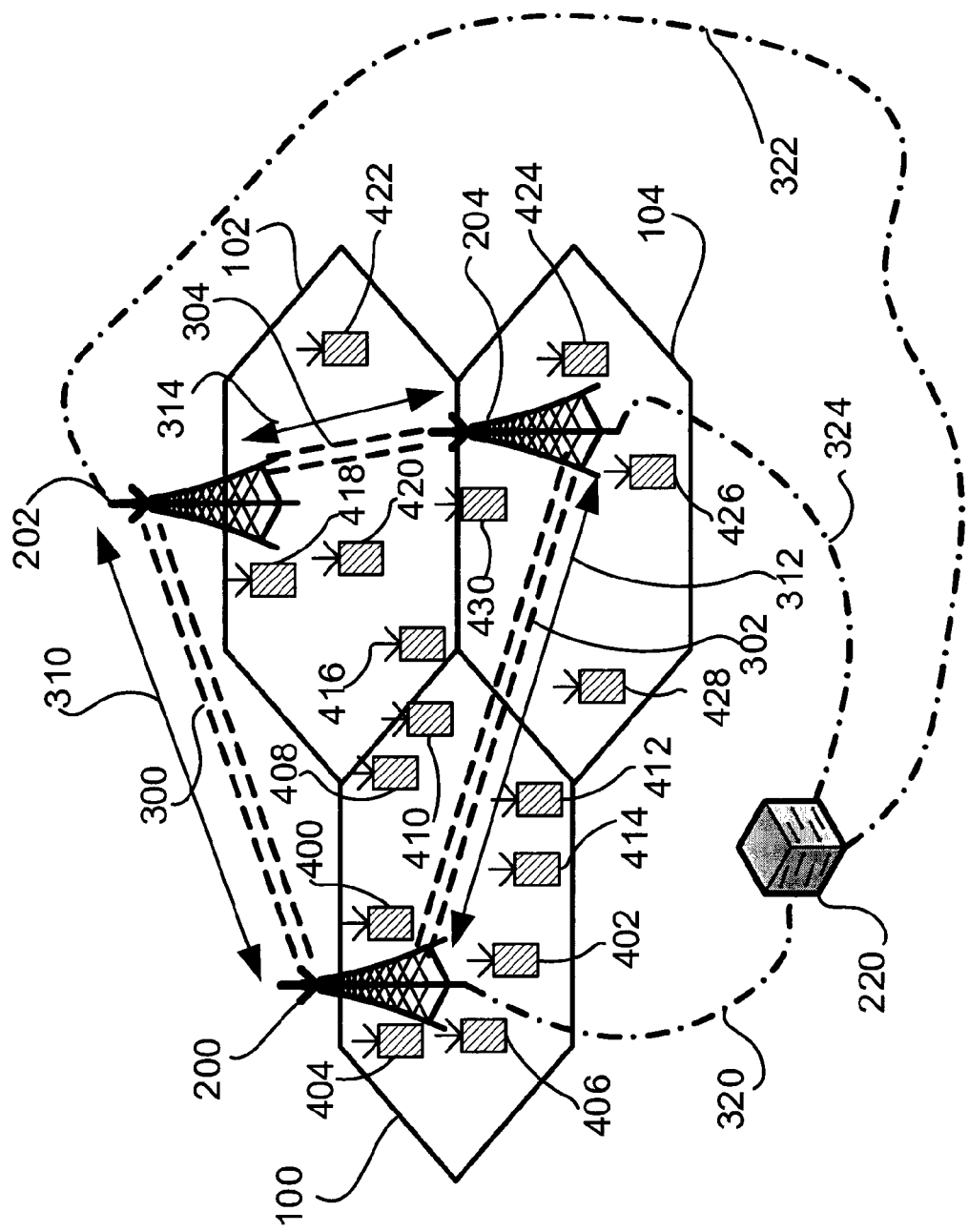
FIG. 3 is a schematic diagram of a multi-cell cellular communication system.

FIG. 3 is a schematic diagram of a multi-cell cellular communication system. The cellular system divides a service coverage area into a number of adjacent wireless coverage areas, i.e., cells. In FIG. 3, the entire service area is formed by cells 100, 102 and 104, each being illustratively shown as a hexagon. Base Stations (BSs) 200, 202 and 204 are associated with the cells 100, 102 and 104, respectively. As known to those skilled in the art, each of the BSs 200-204 comprises at least a transmitter and a receiver. Herein, it is to be noted that a BS, which is generally a serving node in a cell, can be an independent BS having a function of resource scheduling, a transmitting node belonging to an independent BS, a relay node (which is generally configured for further enlarging the coverage of a cell), or the like. As illustratively shown in FIG. 3, each of the BSs 200-204 is located in a particular area of the corresponding one of the cells 100-104 and is equipped with an omni-directional antenna. However, in a cell arrangement for the cellular communication system, each of the BSs 200-204 can also be equipped with a directional antenna for directionally covering a partial area of the corresponding one of the cells 100-104, which is commonly referred to as a sector. Thus, the diagram of the multi-cell cellular communication system as shown in FIG. 3 is illustrative only and does not imply that the implementation of the cellular system according to the present invention is limited to the above particular constraints.

As shown in FIG. 3, the BSs 200-204 are connected with each other via X2 interfaces 300, 302 and 304. In a LTE system, a three-layer node network architecture including base station, radio network control unit and core network is simplified into a two-layer node architecture in which the function of the radio network control unit is assigned to the base station and a wired interface named "X2" is defined for coordination and communication between base stations.

In FIG. 3, the BSs 200-204 are also connected with each other via air interfaces, A1 interfaces, 310, 312 and 314. In a future communication system, it is possible to introduce a concept of relay node. Relay nodes are connected with each other via wireless interfaces and a base station can be considered as a special relay node. Thus, a wireless interface named "A1" can then be used for coordination and communication between base stations.

Additionally, an upper layer entity 220 of the BSs 200-204 is also shown in FIG. 3, which can be a gateway or another network entity such as mobility management entity. The upper layer entity 220 is connected to the BSs 200-204 via S1 interfaces 320, 322 and 324, respectively. In a LTE system, a wired interface named "S1" is defined for coordination and communication between the upper layer entity and the base station.

A number of User Equipments (UEs) 400-430 are distributed over the cells 100-104, as shown in FIG. 3. As known to those skilled in the art, each of the UEs 400-430 comprises a transmitter, a receiver and a mobile terminal control unit. Each of the UEs 400-430 can access the cellular communication system via its serving BS (one of the BSs 200-204). It should be understood that while only 16 UEs are illustratively shown in FIG. 3, there may be a large number of UEs in practice. In this sense, the description of the UEs in FIG. 3 is also for illustrative purpose only. Each of the UEs 400-430 can access the cellular communication network via its serving BS. The BS directly providing communication service to a certain UE is referred to as the serving BS of that UE, while other BSs are referred to non-serving BSs of that UE. The non-serving BSs can function as coordinated BSs of the serving BS and provide communication service to the UE along with the serving BS.

The LTE and its subsequent systems utilize an intra-frequency networking architecture. The Carrier Aggregation (CA) technique is introduced in LTE-A system. With the CA technique, a BS in a cell can use a number of carriers corresponding to different carrier frequencies, while its adjacent cells can also use these carriers to serve UEs in their areas. To serve a UE located at the edge of a cell, its serving BS can be configured into a CoMP status on carriers having the same carrier frequency at the BS of the serving cell and the BSs of coordinated cells. It is to be noted that in the present disclosure, the terms "carrier" and "cell" can be used synonymically in some sense. That is, a "cell" can be substantially represented by a "carrier" in the cell. However, in order to clearly distinguish between the carriers of the serving cell and the carriers of the coordinated cells, the carriers of the serving cell can be referred to as "serving carriers" while the carriers of the coordinated cells can be referred to as "coordinated cells". For explanation of this embodiment, the UE 416 equipped with 2 receiving antennas is considered. The UE 416 has BS 202 as its serving BS and has BSs 200 and 204 as its non-serving BSs. If data transmission to the UE is carried out in the CoMP status, these three BSs need to transmit signals to the UE on carriers having the same carrier frequency. The carrier having the carrier frequency at the BS 202 is referred to as serving carrier 1 and the carriers having the carrier frequency at the BSs 200 and 204 are referred to as coordinated cell 1 and coordinated cell 2, respectively. It is to be noted that this embodiment focuses on the UE 416, which does not imply that the present invention is only applicable to one UE scenario. Rather, the present invention is fully applicable to multi-UE scenario. For example, the inventive method can be applied to the UEs 408, 410, 430 and the like as shown in FIG. 3.

Moreover, according to 3GPP document TR36.213 V9.1.0, "Physical layer procedures", for a downlink LTE system with a bandwidth of 20 MHz, there are around 96 spectral resource blocks in the frequency domain, in addition to a control signaling area. According to a definition, these spectral resource blocks are sorted in an ascending order in terms of frequency. Every eight consecutive spectral resource blocks are referred to as a sub-band. Thus, there are around 12 sub-bands. It is to be noted that the above definition of sub-band, which is compliant with standardized protocols, is exemplified for explaining the embodiments of the present invention. The application of the present invention is not limited to the above definition and is fully applicable to other definitions. By reading the embodiments of the present invention, those skilled in the art can understand that the solution of the present invention is applicable to a general definition of sub-band.

FIG. 4 is a flowchart illustrating the method of resource allocation for CSI feedback according to the present invention.

The method of resource allocation for CSI feedback according to the present invention can be applied to a scenario in which the UE is configured into the CoMP status and can be carried out by the serving BS (e.g., BS 202). As shown in FIG. 4, the method of resource allocation for CSI feedback according to the present invention comprises the following steps. At step S400, a CSI feedback mode for each of a plurality of coordinated cells is configured for a UE. At step S410, feedback resources required for CSI feedback by the UE for each of the plurality of coordinated cells are allocated based on the configured feedback modes, such that the CSI feedbacks for different coordinated cells will not collide with each other within one sub-frame. At step S420, the UE is notified of the configured feedback modes and the allocated feedback resources.

In addition, the method of FIG. 4 can also be applied to a scenario in which the UE is configured into the CoMP status and the CA status (in other words, the UE is configured into a hybrid status of both the CoMP and the CA statuses). In this case, the method further comprises, prior to the step of configuring feedback mode, configuring the UE into a CA status and a CoMP status. Accordingly, the step of configuring feedback mode further comprises configuring, for the UE, a CSI feedback mode for each of a plurality of serving carriers in the CA status and the step of allocating feedback resources further comprises allocating feedback resources required for an CSI feedback by the UE for each of the plurality of serving carriers, such that the CSI feedbacks for different serving carriers and/or different coordinated cells not collide with each other within one sub-frame. Further, in this case, the feedback resources are shared between the CSI feedbacks for the plurality of serving carriers and for the plurality of coordinated cells and the method further comprises indicating to the UE the allocation of the feedback resources between the CSI feedbacks for the plurality of serving carriers and for the plurality of coordinated cells.

It is to be noted here that the each of the plurality of serving carriers and each of the plurality of coordinated cells can be configured with a corresponding CSI feedback mode.

In the above method, when configuring the UE into the CoMP status, the BS needs to determine a measurement set. Herein, the set of cells for which the feedback is actually carried out (i.e., feedback set) can be a subset of the measurement set.

The BS can obtain the information required for determination of the measurement set based on one of the following three approaches:

a Radio Resource Management (RRM) measurement result measured and fed back by the UE, which includes intra-cell and inter-cell measurements;

a predetermined serving carrier for the CoMP status and a corresponding coordinated cell, which can be predetermined by means of cell planning or the like; and UE measured channel information obtained by the BS from aperiodic channel information feedback, including a serving carrier and a coordinated cell.

The BS can determine the measurement set based on any one of, or any combination of, the above three approaches, so as to finally determine and notify the feedback set to the UE via upper layer signaling. Then, the UE can feed back the CSI of the serving carriers and/or coordinated cells over the resources allocated according to the above resource allocation method for CSI feedback.

Next, details will be given on how to determine the measurement set based on the above three approaches.

(Determination of Measurement Set Based on RRM Measurement Result)

In the LTE and its subsequent systems, in order to achieve seamless handover for a UE, it is necessary to measure not only the channel information of the serving cell, but also the channel information of adjacent cells. This is accomplished by means of RRM measurement report. A BS can configure, via RRM signaling, the UE to periodically measure signals from the serving cell and from some neighboring cells detectable by the UE, and to feed the measurement result back to the BS when some predetermined triggering events related to the measurement result occur. When the UE moves to the edge of the cell, the signal strength from several adjacent cells may approach or even exceed the signal strength from the current cell. In this case, with the existing triggering event such as Event A3 (indicating that the signal strength of an adjacent cell exceeds that of the serving cell by an offset) or Event A4 (indicating that the signal strength of an adjacent cell exceeds an absolute value), the BS can determine a set of candidate coordinated cells required for CoMP transmission. Then, the BS can determine a set of cells whose CSI needs to be measured by the UE and a set of cells whose CSI needs to be fed back by the UE.

(Predetermined Measurement Set)

Since the LTE-A system can utilize both the CA and the CoMP techniques, there may be a large number of carriers in each cell. If carriers at all carrier frequencies can be configured for CoMP transmission, the system may suffer from an increased complexity. Thus, at the cell planning stage, the carrier of the serving cell having a given carrier frequency can be dedicated to CoMP transmission. Accordingly, the carriers of adjacent cells having the same carrier frequency become candidate coordinated cells. Then, the BS can determine a set of cells whose CSI needs to be measured by the UE and a set of cells whose CSI needs to be fed back by the UE.

(Aperiodic Channel Information Feedback)

Based on the RRM measurement result, the BS can notify the UE to further measure more accurate channel information of the adjacent cells by scheduling a aperiodic channel information feedback, which can be used in determination of the measurement set. In this case, the scheduling information for the aperiodic channel information feedback needs to contain indication of candidate coordinated cells to be further measured.

Generally, in the above step S400, the plurality of coordinated cells belong to a feedback set and the method further comprises: determining the feedback set, the feedback set being a measurement set containing cells to be measured when the UE is configured into the CoMP status or a subset thereof.

Herein, the measurement set is determined from at least one of: a Radio Resource Management (RRM) measurement result measured and fed back by the UE, the RRM measurement including intra-cell and inter-cell measurements; a predetermined serving carrier for the CoMP status and a corresponding coordinated cell; and UE measured channel information obtained from aperiodic channel information feedback, including a predetermined serving carrier for the CoMP status and a corresponding coordinated cell.

In addition, in the above step S410, the allocation of the feedback resources to the individual coordinated cells can be independent from each other. However, some optimization is also possible to reduce the probability that the feedback resources for different coordinated cells collide with each other within one sub-frame. Further, some optimization is also possible to reduce the feedback resources required for multi-cell CSI feedback.

Specifically, some examples are given below to illustrate the resource allocation approach for multi-cell CSI feedback.

(Independent Resource Allocation for Individual Coordinated Cells)

For the feedback resource allocation in CA status, the individual coordinated cells can be independently configured with parameters for periodic CSI feedback. Similarly, for the resource allocation for CSI feedback in the CoMP status, the individual coordinated cells can be independently configured with upper layer configuration parameters for periodic CSI feedback according to the LTE Rel-8 specification, including the frequency domain resources $n_{PUCCH}^{(2)}$ (optional), period and offset. As shown in FIG. 5, there can be two carriers with different frequencies in the serving cell for the UE, serving carrier 1 and serving carrier 2. The feedback resources for CSI feedback for these two serving carriers can be allocated independently by the BS (only the resource allocation for feedback Type 2 underlying feedback Mode 1-1 is shown herein as an example, denoted as "WB" in FIG. 5). These resources have the same period (equal to 5) and different offsets. In addition to the serving cell, the BS configures the UE to feed back CSI for two coordinated cells which have the same carrier frequency as the serving carrier 1 such that they can be combined with the serving carrier 1 for CoMP transmission. Also, the BS allocates feedback resources to the coordinated cells independently. The coordinated cell 1 also has a feedback resource period of 5, but has different offset than the serving carrier 1. The coordinated cell 2 has a feedback resource period of 16. It is to be noted that, as the feedback resources for a coordinated cell are allocated independently from the resource allocation for other coordinated cells or serving carriers, inevitably, collisions between feedback resources occur sometimes. Here, the feedback resources for the serving carrier 1 and the coordinated cell 2 collide with each other at sub-frame 3. The solution mechanism for resource collision will be detailed later.

(Optimization of Feedback Resource Allocation for Reducing Resource Collision Probability)

In view of the fact that the shorter feedback periods of the feedback resources leads to more frequent resource collisions between different serving carriers, between different coordinated cells or between a serving carrier and a coordinated cell, it is possible to reduce the resource collision probability by increasing the periods of feedback resources corresponding to different serving carriers and/or different coordinated cells. For example, according to the LTE Rel-8 specification on frequency division duplex system, the feedback period of CQI can be configured as one of the following values: {2, 5, 10, 16, 20, 32, 40, 64, 80, 128, 160} ms or the CQI feedback can be turned off. In order to reduce the resource collision probability when there are a large number of serving carriers and coordinated cells, the configurable value range of the CQI feedback period can be limited, for example, to {5, 10, 16, 20, 32, 40, 64, 80, 128, 160} ms (the CQI feedback period of 2 ms is prohibited) or the CQI feedback can be turned off. It is also possible to reduce the resource collision probability by setting, for a single UE, the feedback period of a feedback type underlying a feedback mode of a serving carrier or a coordinated cell to be a multiple of the feedback period of a feedback type underlying a feedback mode of another serving carrier or another coordinated cell and setting, for a single UE, a feedback type underlying a feedback mode of a serving carrier or a coordinated cell to have a different sub-frame offset than a feedback type underlying a feedback mode of another serving carrier or another coordinated cell.

In other words, in the above step S410, the feedback resources for the plurality of coordinated cells can be allocated jointly, so as to reduce the resource collision probability. Specifically, the step S410 can comprise increasing the period of the feedback resources corresponding to different coordinated cells. Alternatively, the step S410 can comprise setting, for a single UE, the feedback period of a feedback type underlying a feedback mode of a coordinated cell to be a multiple of the feedback period of a feedback type underlying a feedback mode of another coordinated cell and setting, for a single UE, a feedback type underlying a feedback mode of a coordinated cell to have a different sub-frame offset than a feedback type underlying a feedback mode of another coordinated cell.

Accordingly, when the method of FIG. 4 is applied to a scenario in which the UE is configured into the CoMP status and the CA status, the step S410 can comprise increasing the period of the feedback resources corresponding to different serving carriers and different coordinated cells. Alternatively, the step S410 can comprise setting, for a single UE, the feedback period of a feedback type underlying a feedback mode of a serving carrier or a coordinated cell to be a multiple of the feedback period of a feedback type underlying a feedback mode of another serving carrier or another coordinated cell and setting, for a single UE, a feedback type underlying a feedback mode of a serving carrier or a coordinated cell to have a different sub-frame offset than a feedback type underlying a feedback mode of another serving carrier or another coordinated cell.

It is to be noted here that with the above approach for independently allocating feedback resources to individual coordinated cells or the above approach for jointly optimizing the feedback resource allocation for a plurality of coordinated cells to reduce the collision probability, some collision solution rules will be still required to solve the collision between feedback types underlying different feedback modes within one sub-frame, which will be detailed later.

(Optimization of Feedback Resource Allocation for Reducing Feedback Resource Usage)

The CSI for a coordinated cell mainly provides information on channel direction, which will not vary significantly since a UE in the CoMP status is typically moving at a slow speed. Thus, it may not be necessary to feed back the CSI for a coordinated cell as detailed, or as frequent, as the feedback of the CSI for a serving carrier. As such, it is possible to multiplex the time domain resources for CSI feedback for a plurality of coordinated cells into a feedback period defined in LTE Rel-8 specification. As shown in FIG. 6, the feedback resources for the coordinated cells 1-3 are multiplexed into a feedback period of 5. It can be seen that the time domain resources for each of the coordinated cells 1-3 have an equivalent period of 15, which is not defined in the LTE Rel-8 specification.

In other words, in the above step S410, the CSI feedback resources for the plurality of coordinated cells can be multiplexed.

(Feedback Resource Allocation for Periodic PUSCH)

The BS can configure a semi-persistent schedule via upper layer signaling to schedule a period Physical Uplink Shared Channel (PUSCH) as the CSI feedback resources. Individual coordinated cells can be independently configured with period PUSCHs as their CSI feedback resources. An optimization is also possible to configure one period PUSCH for feedback of aggregated CSI for a plurality of coordinated cells and/or serving carriers. Specifically, it is possible to configure via upper layer signaling which coordinated cells and/or serving carriers will have their CSI transmitted over the periodic PUSCH.

In other words, in the above step S410, a semi-persistent schedule is configured via upper layer signaling to schedule a period PUSCH as the CSI feedback resources.

In addition, in the above step S420, the configured feedback mode and the allocated feedback resources are notified to the UE via upper layer signaling.

Figure 7:
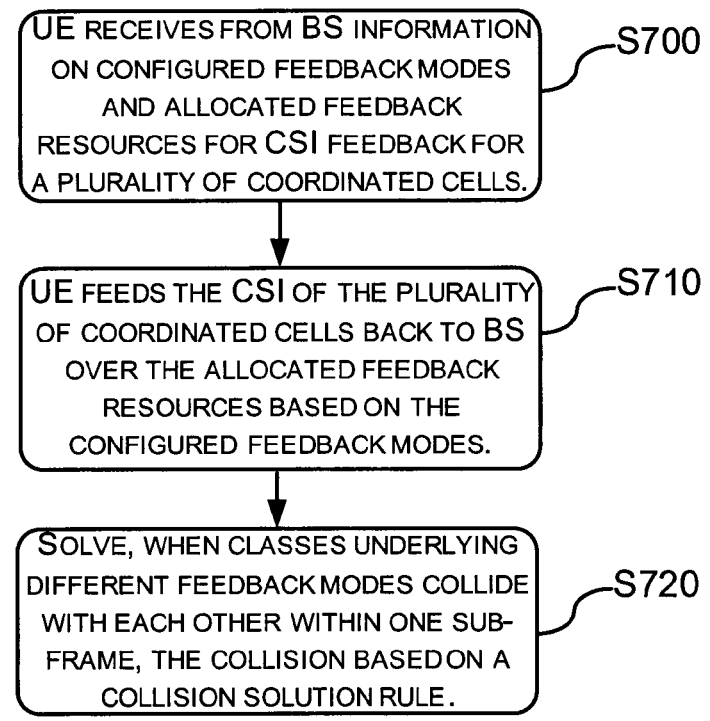
FIG. 7 is a flowchart illustrating the method of CSI feedback according to the present invention.

FIG. 7 is a flowchart illustrating the method of CSI feedback according to the present invention. The method of CSI feedback according to the present invention can be applied to a scenario in which the UE is configured into the CoMP status and can be carried out over uplink resources of the serving cell.

As shown in FIG. 7, the method of CSI feedback according to the present invention comprises the following steps. At step S700, a UE receives from a BS information on configured feedback modes and allocated feedback resources for CSI feedback for a plurality of coordinated cells. At step S710, the UE feeds the CSI of the plurality of coordinated cells back to the BS over the allocated feedback resources based on the configured feedback modes. At step S720, when feedback types underlying different feedback modes collide with each other within one sub-frame, the collision is solved based on a collision solution rule.

In addition, the method of FIG. 7 can also be applied to a scenario in which the UE is configured into the CoMP status and the CA status (in other words, the UE is configured into a hybrid status of both the CoMP and the CA statuses). In this case, the method further comprises the BS configuring the UE into a Carrier Aggregation (CA) status and a Coordinated Multi-Point (CoMP) status. Herein, the UE further receives from the BS information on configured feedback modes and allocated feedback resources for CSI feedback for a plurality of serving carriers in the CA status. Further, in this case, the feedback resources are shared between the CSI feedbacks for the plurality of serving carriers and for the plurality of coordinated cells. Herein, the method further comprises the UE receiving from the BS the allocation of the feedback resources between the CSI feedbacks for the plurality of serving carriers and for the plurality of coordinated cells.

It is to be noted here that the each of the plurality of serving carriers and each of the plurality of coordinated cells can be configured with a corresponding CSI feedback mode.

Due to the constraint imposed by the single carrier characteristic in LTE-A uplink, one sub-frame can only carry one PUCCH. In the above method, when feedback types underlying different feedback modes collide with each other within one sub-frame (i.e., using the same PUCCH resource), some collision solution rules are required to solve such collision. Specifically, the following collision solution rules are provided to achieve different effects.

(Feedback Type-Prioritized Rule)

The collision solution rule can be defined as a type-prioritized rule in which a type with a longer period has a higher priority. When the feedback resources for different coordinated cells (or different serving carriers and coordinated cells) collide with each other within one sub-frame, a type with a high priority will be fed back while a type with a low priority will be discarded. When types with the same priority collide with each other, further priority can be determined based on a further rule.

A type with a longer period typically relates to information in the CSI which changes more slowly, such as a rank of a channel. Such information is typically referenced in calculation of other types of channel information to be fed back subsequently. Thus, the loss of such information may have significant impact on the system performance. Accordingly, this type of information should have higher priority than the other types of channel information for feedback to the UE. In this way, this collision solution rule solves the collision between CSI feedbacks without significant degrading system performance.

(Mode-Prioritized Rule Based on Feedback Overhead)

Alternatively, the collision solution rule can be defined as a mode-prioritized rule in which a mode with a lower feedback overhead has a higher priority, the priority of a mode being the priority of each type contained in the mode. When a collision occurs, a type with a high priority will be fed back while a type with a low priority will be discarded. When types with the same priority collide with each other, further priority can be determined based on a further rule.

The feedback overhead can be calculated from the number of feedbacks in a complete feedback period and the payload of each feedback. From the perspective of feedback overhead, a feedback type with a lower feedback overhead should be given a higher priority. In this way, this collision solution rule solves the collision between CSI feedbacks while reducing the feedback overhead of the system to some extent.

(Mode-Prioritized Rule Based on Pre-Configured Priority)

Alternatively, the collision solution rule can be defined as a mode-prioritized rule in which each mode has a pre-configured priority, the priority of a mode being the priority of each type contained in the mode. When a collision occurs, a type with a high priority will be fed back while a type with a low priority will be discarded. When types with the same priority collide with each other, further priority can be determined based on a further rule.

Different feedback modes correspond to different transmission approaches, which sometimes have different importance levels to a UE. For example, if a UE configured into both the CA status and the CoMP status is located at the edge of a cell, obviously, a feedback mode corresponding to a transmission approach of a coordinated cell has higher priority than a feedback mode corresponding to a transmission approach of a serving carrier, since at this time the CoMP transmission may be more suitable for the channel environment of the UE. In this way, this collision solution rule solves the collision between CSI feedbacks, with optimization for the channel environment of the UE to ensure the system performance.

(Coordinated-Cell (Serving Carrier/Coordinated-Cell)-Prioritized Rule Based on Pre-Configured Priority)

Alternatively, the collision solution rule can be defined as a coordinated-cell-prioritized rule in which each mode for a coordinated cell has a pre-configured priority, the priority of a mode being the priority of each type contained in the mode. When a collision occurs, a type with a high priority will be fed back while a type with a low priority will be discarded.

When the above method is applied to a scenario in which the UE is configured into the CoMP status and the CA status, the collision solution rule can be defined as a serving-carrier/coordinated-cell-prioritized rule in which each mode for a serving carrier or a coordinated cell has a pre-configured priority, the priority of a mode being the priority of each type contained in the mode. When a collision occurs, a type with a high priority will be fed back while a type with a low priority will be discarded.

As an example, in the LTE-A system incoporating the CA technique, one of the serving carriers is defined as Primary Component Carrier (PCC). A mode on the PCC can be defined to have the highest priority and the modes on other serving carriers and on coordinated cells can have priorities ordered in a pre-determined manner. For example, the priorities can be arranged in an ascending order of the Carrier index (CC index) of Serving Carrier and the cell index of coordinated cell, and the priority of any serving carrier is higher than the priority of any coordinated cell.

This collision solution rule is simple and effective, which minimizes the modification to the standards.

(Content-Prioritized Rule)

Alternatively, the collision solution rule can be defined as a content-prioritized rule in which a type carrying larger amount of information has a higher priority. When a collision occurs, a type with a high priority will be fed back while a type with a low priority will be discarded. When types with the same priority collide with each other, further priority can be determined based on a further rule.

In contrary to the mode-prioritized rule based on feedback overhead, the content-prioritized rule gives a higher priority to a type carrying a larger amount of information (payload). From the perspective of a particular feedback mode, discarding a feedback type carrying a larger amount of information will have greater impact on the transmission approach corresponding to the feedback mode. In this way, this collision solution rule solves the collision between CSI feedbacks without significantly degrading the performance of the transmission approach.

(Upper-Layer-Signaling-Notification-Prioritized Rule)

Alternatively, the collision solution rule can be defined as an upper-layer-signaling-notification-prioritized rule in which the priorities of the types for serving carriers or coordinated cells are notified from the BS to the UE via upper layer signaling. When a collision occurs, a type with a high priority will be fed back while a type with a low priority will be discarded.

The upper-layer-signaling-notification-prioritized rule can be combined with another rule, such as the above coordinated-cell (serving-carrier/coordinated-cell)-prioritized rule. In this case, the BS can notify to the UE the priority order of the serving carriers and the coordinated cells via upper layer signaling. The upper layer signaling can also be used to notify a further priority order for solution of collision between feedback types having the same priority. This collision solution rule is more flexible than the other collision solution rules in that the priority adjustment can be performed by the BS.

In the following, the configuration of transmission approaches and feedback modes will be further described in connection with the serving-carrier/coordinated-cell-prioritized rule.

Exemplary Scenario: As shown in FIG. 3, the UE 416 can be configured with two serving carriers (carriers #1 and #2) and two coordinated cells (i.e., the carriers of BS 200 and BS 204 which correspond to carrier frequency #1, denoted as cell #1 and cell #2, respectively). The carrier #1 is the PCC. The UE can be scheduled into the CoMP status for downlink transmission on carrier #1, cell #1 and cell #2. Thus, these three carriers (cells) constitute the coordination set of the UE, which can also be the measurement set and the report set. The feedback for the serving carriers by the UE 416 is configured based on the transmission approaches. For example, the transmission approaches for carrier #1 and carrier #2 can be "4) closed-loop space division multiplexing (requiring PMI feedback from UE)" and "Multi-user MIMO (multiple UEs simultaneously participate in the downlink communication of MIMO system)", respectively. The feedback modes configured for carrier #1 and carrier #2 can be Mode 2-1 and Mode 1-1, respectively. The feedback for the coordinated cells by the UE 416 is configured as Mode 1-1.

It is to be noted that the conditions assumed in the exemplary scenarios are illustrated for the purpose of explaining the embodiments of the present invention only. The present invention is not limited to the above assumption and is fully applicable to other assumptions. By reading the embodiments of the present invention, those skilled in the art can understand that the solution of the present invention is also applicable to a general situation.

As noted above, Mode 2-1 is a combination of Type 3, Type 2 and Type 1. That is, the feedbacks of Type 3, Type 2 and Type 1 are carried out at different periods and/or with different sub-frame offsets. In the Mode 2-1, the broadband PMI of the Set S, the broadband CQIs for the individual codewords and possibly the RI information, as well as one preferred sub-band location in the BP and the CQI for the sub-band are fed back. Mode 1-1 is a combination of Type 3 and Type 2. That is, the feedbacks of Type 3 and Type 2 are carried out at different periods and/or with different sub-frame offsets. In the Mode 1-1, the broadband PMI of the Set S, the broadband CQIs for the individual codewords and possibly the RI information are fed back.

The feedback sub-frames of Type 3, Type 2 and Type 1 of the Mode 2-1 for the carrier #1 satisfy:

$$(10 \times n_f + \lfloor n_s/2 \rfloor - N_{OFFSET,CQI}^{(2)} - N_{OFFSET,RI}^{(2)}) \bmod (H^{(2)} \cdot N_P^{(2)} \cdot M_{RI}^{(2)}) = 0 \text{ for Type 3,}$$

and $$(10 \times n_f + \lfloor n_s/2 \rfloor - N_{OFFSET,CQI}^{(2)}) \bmod (H^{(2)} \cdot N_P^{(2)}) = 0 \text{ for Type 2}$$

and $$(10 \times n_f + \lfloor n_s/2 \rfloor - N_{OFFSET,CQI}^{(2)}) \bmod N_P^{(2)} = 0 \text{ for Type 1,}$$

respectively, where $n_f$ is the number system frames; $n_s$ is the number of time slots in one radio frame; $N_{OFFSET,CQI}^{(2)}$ is the sub-frame offset for the CQI feedback in the Mode 2-1 for the carrier #1 (representing both the sub-frame offset for broadband CQI feedback and the sub-frame offset for sub-band CQI feedback); $N_{OFFSET,RI}^{(2)}$ is the sub-frame offset for the RI feedback in the Mode 2-1 for the carrier #1 (which is actually an additive offset with respect to and $N_{OFFSET,CQI}^{(2)}$); and $H^{(2)}$, $N_P^{(2)}$ and $M_{RI}^{(2)}$ are periodic parameters for the feedback modes in the Mode 2-1 for the carrier #1, each being a positive integer.

The feedback sub-frames of Type 3 and Type 2 of the Mode 1-1 for the carrier #2, cell #1 and cell #2 satisfy:

$$(10 \times n_f + \lfloor n_s/2 \rfloor - N_{OFFSET,CQI}^{(1)} - N_{OFFSET,RI}^{(1)}) \bmod (N_P^{(1)} \cdot M_{RI}^{(1)}) = 0 \text{ for Type 3,}$$

and $$(10 \times n_f + \lfloor n_s/2 \rfloor - N_{OFFSET,CQI}^{(1)}) \bmod N_P^{(1)} = 0 \text{ for Type 2,}$$

respectively, where $n_f$ is the number system frames; $n_s$ is the number of time slots in one radio frame; $N_{OFFSET,CQI}^{(1)}$ is the sub-frame offset for the CQI feedback in the Mode 1-1 (representing both the sub-frame offset for broadband CQI feedback and the sub-frame offset for sub-band CQI feedback); $N_{OFFSET,RI}^{(1)}$ is the sub-frame offset for the RI feedback in the Mode 1-1 (which is actually an additive offset with respect to $N_{OFFSET,CQI}^{(1)}$); and $N_P^{(1)}$ and $M_{RI}^{(1)}$ periodic parameters for the feedback modes in the Mode 1-1, each being a positive integer.

In order to prevent feedback types (which can be the same or different feedback types) underlying different feedback modes from colliding with each other within one sub-frame, the feedback period of a feedback type underlying a feedback mode can be set to be a multiple of the feedback period of a feedback type underlying another feedback mode and different feedback modes can have different sub-frame offsets. In other words, each of $N_P^{(1)}$ for carrier #2, $N_P^{(1)}$ for cell #1, $N_P^{(1)}$ for cell #2 and $N_P^{(2)}$ for carrier #1 can be a multiple of another; and $N_{OFFSET,CQI}$ for carrier #2, $N_{OFFSET,CQI}^{(1)}$ for cell #1, $N_{OFFSET,CQI}^{(1)}$ for cell #2 and $N_{OFFSET,CQI}^{(2)}$ for carrier #1 are different from each other.

Further, in this configuration, it is possible that, for a single feedback mode, the sub-frame offset for the RI feedback is the same as the sub-frame offset for the CQI feedback. That is, each of $N_{OFFSET,RI}^{(1)}$ and $N_{OFFSET,RI}^{(2)}$ can be zero.

The priorities of the serving carriers/coordinated cells can be configured in such a manner that the Mode 2-1 for carrier #1 has the highest priority, the Mode 1-1 for carrier #2 has the second highest priority, the Mode 1-1 for cell #1 has the third highest priority and the Mode 1-1 for cell #2 has the lowest priority. The priorities of the feedback modes for the respective serving carriers/coordinated cells are inherited by their underlying feedback types. When a collision occurs, a type with a high priority will be fed back and a type with a low priority will be discarded. For example, when the Type 3 underlying Mode 2-1 for carrier #1 collides with the Type 3 underlying Mode 1-1 for cell #2, the Type 3 underlying Mode 2-1 for carrier #1 will override the Type 3 underlying Mode 1-1 for cell #2. In other words, when the collision occurs, only the Type 3 underlying Mode 2-1 for carrier #1 will be transmitted while the Type 3 underlying Mode 1-1 for cell #2 will be discarded.

Referring now to FIG. 8 which shows a schematic diagram of feedback resource allocation when UE is configured into the CA status and the CoMP status. The feedback resource allocation shown in FIG. 8 corresponds to the case where the method of FIG. 4 is applied to a scenario in which the UE is configured into the CoMP status and the CA status. In this case, the BS can allocate a set of feedback resources to the UE, which can be shared between the above two statuses. The BS can indicate to the UE the allocation of feedback resources between these two statuses via additional signaling.

When the UE is configured into both the CA and the CoMP statuses, the BS may need to set (specify) for the UE an upper limit of the total number of serving carriers and coordinated cells supportable in one feedback period. For example, the total number of serving carriers and coordinated cell which can be periodically feedback at a time can be set to 5. In this case, the BS needs to allocate no more than 5 periodic feedback resources to the UE. As shown in FIG. 8, the UE has 5 serving carriers, wherein the PCC and the secondary carrier #1 have 3 and 2 potential coordinated cells, respectively. The feedback resources for each of these serving carriers and coordinated cells can be configured into one of the above 5 resources via upper layer signaling. Here, it is to be noted that some serving carriers and coordinated cells may be configured with the same feedback resources.

When the BS determines the optimal transmission status for the UE as "CA-only without CoMP" based on the RRM measurement report from the UE, e.g., when the UE is located around the center of the cell and the signal strengths from the coordinated cells are weak, the BS can activate all of the 5 serving carriers each occupying one of the above five pre-allocated feedback resources. The resource allocation can be carried out by mapping each carrier into its corresponding feedback resource in advance via upper layer signaling or by utilizing an activation signaling (which, according to the current agreement of LTE-A, can be a MAC command based on Layer 2) carrying indication of the such resource mapping.

When the UE moves in the cell or even to the edge of the cell, the BS determines that "CA+CoMP" status is more suitable for the UE based on the RRM measurement report. The BS can deactivate some of the serving carriers to release part of feedback resources, which can then be allocated to a coordinated cell requiring measurement feedback. As shown in FIG. 8, in the transition from status (A) to status (B), the BS releases the secondary carriers #3 and #4 and allocates their corresponding feedback resources to the coordinated cells #1 and #2 which operate at the same frequency as the PCC. Here, the release signaling (which, according to the current agreement of LTE-A, can be a MAC command based on Layer 2) can carry information indicating whether the feedback resources corresponding to the released serving carriers are reallocated and which coordinated cell they are allocated to. Such additional indication information will not be necessary if the feedback resources corresponding to the released serving carriers are the same as the feedback resources to be reallocated to the coordinated cell as initially indicated in upper layer signaling configuration.

When there is more than one carrier frequency capable of CoMP transmission, the statuses (A) and (B) can be transited to the status (C) shown in FIG. 8.

The status (D) in FIG. 8 is a "CoMP-only without CA" status in which the serving carriers other than that participating CoMP transmission are all released and allocated to one or more coordinated cells for their periodic CSI feedback.

On the other hand, when the UE moves from the edge of the cell towards the center of the cell, the signal strengths of the coordinated cells continuously drops and the signal strengths of the serving carriers continuously increases. After detecting this based on the RRM measurement report, the BS can gradually increase the number of activated serving carriers. When a serving carrier is activated, the feedback resource (denoted as #1) corresponding to the serving carrier is reallocated for its CSI feedback. That is, the coordinated cell utilizing that feedback resource #1 is automatically excluded from the CoMP measurement/feedback set. Alternatively, the activating signaling can carry information indicating the serving carrier to be activated utilizes another feedback resource (denoted as #2). In this case, it is the coordinated cell utilizing the other feedback resource #2, rather than the coordinated cell utilizing that feedback resource #1, that is excluded from the CoMP measurement/feedback set.

It can be appreciated that the number of pre-allocated feedback resources (5) is not a strict constraint. During an actual communication process, it is possible to reconfigure via upper layer signaling to increase or decrease the pre-allocated resources. The above activating/releasing signaling can be used to achieve this reconfiguration. In general, the above activating/releasing signaling can contain one or more of the following:

the feedback resources (including frequency domain and time domain resource) for the feedback mode corresponding to the transmission approach of the activated serving carrier, or an indication thereof (for reducing the overhead of Layer 2 signaling);

indication of whether the feedback resources corresponding to the released serving carrier are reallocated; and indication of which serving carrier or coordinated cell the feedback resources corresponding to the released serving carrier are reallocated to.

A number of examples have been illustrated in the above description. While the inventor has tried to list the examples in association with each other, it does not imply that it is required for the listed examples to have such correspondence as described. A number of solutions can be achieved by selecting examples having no correspondence as long as the conditions underlying the selected examples do not conflict with each other. Such solutions are encompassed by the scope of the present invention.

The present invention has been described above with reference to the preferred embodiments thereof. It should be understood that various modifications, alternations and additions can be made by those skilled in the art without departing from the spirits and scope of the present invention. Therefore, the scope of the present invention is not limited to the above particular embodiments but only defined by the claims as attached.

The invention claimed is:
1. A user equipment communicating with a base station, the user equipment comprising:
an upper layer processing circuit configured to configure a plurality of channel state information transmissions for a same downlink component carrier via upper layer signaling, a subframe periodicity and a subframe offset being independently configured for each of the plurality of channel state information transmissions; and a transmission circuit configured to periodically transmit, based on the subframe periodicity and the subframe offset, channel state information for each of the plurality of channel state information transmissions; wherein in a case of collision among the plurality of channel state information transmissions with feedback types of a same priority in a given subframe, the channel state information for a specific channel state information transmission is transmitted in the given subframe and the channel state information for another specific channel state information transmission is discarded in the given subframe.

2. The user equipment according to claim 1, wherein each of uplink resources for each of the plurality of channel state information transmissions is determined from the subframe periodicity and/or the sub-frame offset.

3. The user equipment according to claim 1, wherein
priority is pre-determined with respect to feedback type; and
a specific channel state information is determined based on the priorities of the plurality of channel state information.

4. The user equipment according to claim 1, wherein the channel state information includes at least a channel quality index (CQI).

5. A method for user equipment communicating with a base station, the method comprising:
configuring a plurality of channel state information transmissions for a same downlink component carrier via upper layer signaling, a subframe periodicity and a subframe offset being independently configured for each of the plurality of channel state information transmissions;

transmitting periodically, based on the subframe periodicity and the subframe offset, channel state information for each of the plurality of channel state information transmissions; wherein in a case of collision among the plurality of channel state information transmissions with feedback types of a same priority in a given subframe, the channel state information for a specific channel state information transmission is transmitted in the given subframe and the channel state information for another specific channel state information transmission is discarded in the given subframe.

6. A base station communicating with a user equipment, the base station comprising:

an upper layer processing circuit configured to send, to the user equipment, a configuration of a plurality of channel state information transmissions for a same downlink component carrier via upper layer signaling, a subframe periodicity and a subframe offset being independently configured for each of the plurality of channel state information transmissions;

a reception circuit configured to periodically receive, based on the subframe periodicity and the subframe offset, channel state information for each of the plurality of channel state information transmissions; wherein in a case of collision among the plurality of channel state information transmissions with feedback types of a same priority in a given subframe, the channel state information for a specific channel state information transmission is transmitted in the given subframe and the channel state information for another specific channel state information transmission is discarded in the given subframe.

* * * * *